US008878787B2

(12) United States Patent
Stergiou et al.

(10) Patent No.: US 8,878,787 B2
(45) Date of Patent: Nov. 4, 2014

(54) MULTI-TOUCH USER INPUT BASED ON MULTIPLE QUICK-POINT CONTROLLERS

(75) Inventors: Stergios Stergiou, Palo Alto, CA (US); Jawahar Jain, Los Altos, CA (US); David Loren Marvit, San Francisco, CA (US)

(73) Assignee: Fujitsu Limited, Kawasaki-shi (JP)

( * ) Notice: Subject to any disclaimer, the term of this patent is extended or adjusted under 35 U.S.C. 154(b) by 935 days.

(21) Appl. No.: 12/855,954

(22) Filed: Aug. 13, 2010

(65) Prior Publication Data

US 2012/0038674 A1 Feb. 16, 2012

(51) Int. Cl.
*G05G 9/047* (2006.01)
*G06F 3/02* (2006.01)
*G06F 3/0485* (2013.01)
*G06F 3/0481* (2013.01)

(52) U.S. Cl.
CPC .... *G06F 3/0213* (2013.01); *G06F 2203/04808* (2013.01); *G06F 3/0205* (2013.01); *G06F 3/0485* (2013.01); *G06F 3/0481* (2013.01); *G06F 2203/04806* (2013.01)
USPC .......................................... 345/161; 345/157

(58) Field of Classification Search
USPC ........................ 345/156, 173, 160, 161, 168
See application file for complete search history.

(56) References Cited

U.S. PATENT DOCUMENTS

| 5,570,111 A | 10/1996 | Barrett |
| 2007/0177803 A1 | 8/2007 | Elias |
| 2007/0177804 A1 | 8/2007 | Elias |
| 2008/0163130 A1 | 7/2008 | Westerman |
| 2010/0026626 A1* | 2/2010 | Macfarlane .................. 345/160 |
| 2011/0210917 A1* | 9/2011 | LaFave et al. ................ 345/160 |

OTHER PUBLICATIONS

IBM User System Ergonomics Research, TrackPoint—In Keyboard Pointing Device, http://www.almaden.ibm.com/cs/user/tp/tp:html, downloaded Jun. 30, 2010.
IBM User System Ergonomics Research, TrackPoint Mouse, http://www.almaden.ibm.com/cs/user/tpmouse.html, downloaded Jun. 30, 2010.
IBM User System Ergonomics Research, Tactile TrackPoint—Touch Feedback, http://www.almaden.ibm.com/cs/user/tp/tactile.html, downloaded Jun. 30, 2010.
IBM User System Ergonomics Research, TrackPoint—Negative Inertia, http://www.almaden.ibm.com/cs/user/tp/ninertia.html, downloaded Jun. 30, 2010.
IBM User System Ergonomics Research, Two-Handed Keyboard, http://www.almaden.ibm.com/cs/user/tp/thand.html, downloaded Jun. 30, 2010.
IBM User System Ergonomics Research, Science Exploration Wand, http://www.almaden.ibm.com/cs/user/tp/science.html, downloaded Jun. 30, 2010.
TrackPoint Caps and How to Order for ThinkPad Systems and TrackPoint Keyboards, http://www-307.ibm.com/pc/support/site.wssVLAR-443LTU.html, downloaded Jun. 30, 2010.

(Continued)

*Primary Examiner* — Dwayne Bost
*Assistant Examiner* — Robert Michaud
(74) *Attorney, Agent, or Firm* — Baker Botts L.L.P.

(57) ABSTRACT

In one embodiment, a method includes receiving first input from a first quick-point controller in a keypad that comprises a plurality of keys; receiving second input from a second quick-point controller in the keypad; and rendering a multi-touch gesture on a display associated with the keypad based on the first and second input.

20 Claims, 7 Drawing Sheets

(56) References Cited

OTHER PUBLICATIONS

Peter Golden, Product Development The Development of the IBM ThinkPad, Part 1, Big Blue's Bid Adventure, http://www.petergolden.com/Articles/ThinkPad-1(EB-PAG).html, downloaded Jun. 30, 2010.

Waldemar Karwowski and Gavriel Salvendy, 2008 AHFE International Conference, Las Vegas, Nevada, US, Jul. 14-17, 2008.

* cited by examiner

MULTI-TOUCH USER INPUT BASED ON MULTIPLE QUICK-POINT CONTROLLERS

TECHNICAL FIELD

This disclosure relates generally multi-touch user input.

BACKGROUND

Computers and other electronic devices provide various mechanisms that enable their users to interact with them. For example, a user may provide input to a computer via the use of a keyboard, a mouse, a touchpad, a quick-point controller, a touch screen, a stylus, or a joy stick. Over the years, the ways users may interact with computers and other electronic devices have changed. More recently, the use of multi-finger, touch-sensitive user interfaces (multi-touch interfaces) is increasingly adopted for interacting with computers and other electronic devices, allowing user-computer interactions to become more straightforward, intuitive, efficient, and ergonomical.

DESCRIPTION OF EXAMPLE EMBODIMENTS

Figure 1:
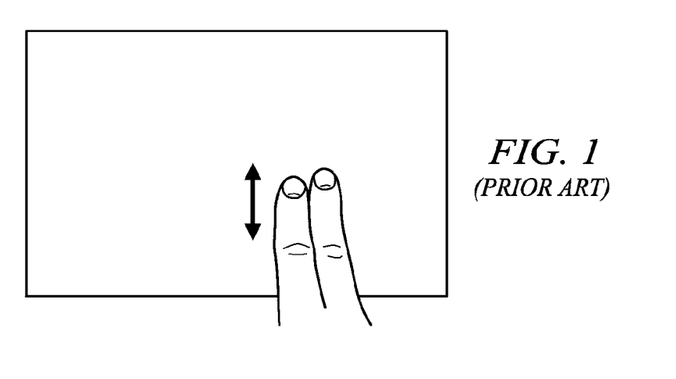
FIG. 1 illustrates an example multi-touch gesture for scrolling.
Figure 2:
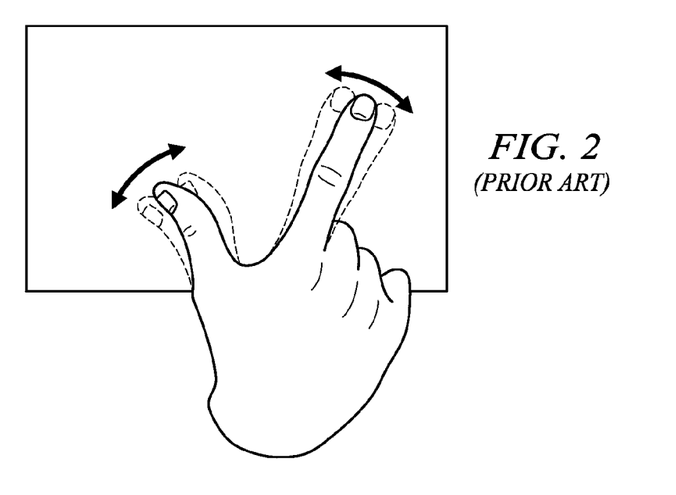
FIG. 2 illustrates an example multi-touch gesture for pinching and expanding.
Figure 3:
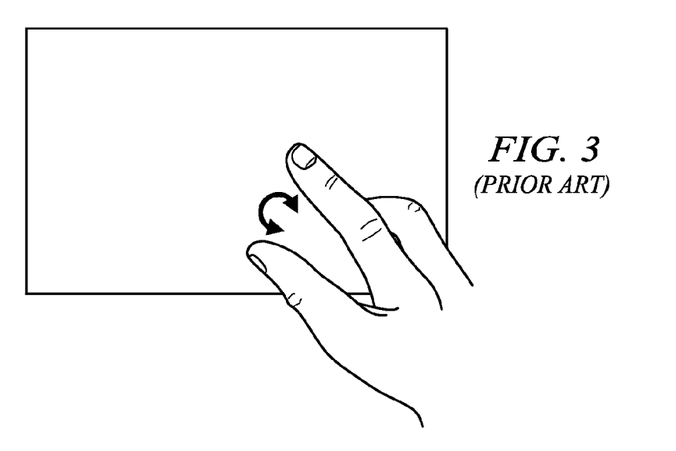
FIG. 3 illustrates an example multi-touch gesture for rotating.

With a multi-touch interface, a user may make use of hand and finger gestures to interact with a computer or other electronic device, often in ways a conventional mouse and keyboard cannot easily achieve. For example, to scroll, the user may rest one or two fingers on a touchpad and move the fingers up and down on the surface of the touchpad, as illustrated in FIG. 1. To pinch or expand, the user may rest two fingers on the touchpad and move the two fingers either closer together or farther apart on the surface of the touchpad, as illustrated in FIG. 2. To rotate, the user may rest a finger on the touchpad and move the finger either in a clockwise circle or a counterclockwise circle on the surface of the touchpad, as illustrated in FIG. 3.

Multi-touch gestures may be simple or complicated, may involve one hand or both hands, and may require one finger or the coordination of multiple fingers. A multi-touch gesture may result from a single hand-finger movement or a sequence of hand-finger movements. Consequently, the number of different multi-touch gestures may be quite large because of the wide range of possible hand-finger movements. Each motion of hands and fingers, whether simple or complex, may convey a specific meaning or action, which may be interpreted as an input to the computer and is acted upon by the computer. It is therefore conceivable that an entirely new gesture language may evolve that eventually allows users to convey complex meanings and commands to computers and other electronic devices by moving their hands and fingers in particular patterns.

Multi-finger, touch sensitive user interfaces, or multi-touch interfaces, utilize various hand-finger gestures to represent different inputs and commands to computers and other electronic devices, thus providing a mechanism for users to interact with the computers and other electronic devices. In particular embodiments, a multi-touch gesture may be considered to include at least two phases that, taken together in sequence, signal the beginning and completion of a particular gesture. The first phase of a multi-touch gesture may include presenting a specific combination of hand or finger parts in a particular configuration. In particular embodiments, this may include placing the hand or finger parts down on a multi-touch surface, such as a touchpad or a touch screen. The second phase of the multi-touch gesture may include, for example, motion of the specific hand parts. The motion may take the form of lateral motions such as rotation, translation, expansion, or contraction, which may comprise moving the hand parts around the multi-touch surface. The motion may also take the form of vertical motions such as single or double-tapping.

Multi-touch interfaces have become popular. There are different physical implementations of the multi-touch interfaces, depending on the size and type of the interface. Most often, a multi-touch interface is either based on cameras that track the movement of hands and fingers or touchpad surfaces that can register more than one finger at the same time. For example, both touch tables and touch walls project an image through acrylic or glass, and then back-light the image with light-emitted diodes (LEDs). When a finger touches the surface, causing the light to scatter, the reflection is caught with sensors or cameras that send the data to software that dictates response to the touch, depending on the type of reflection measured. Touch surfaces can also be made pressure-sensitive by the addition of a pressure-sensitive coating that flexes differently depending on how firmly it is pressed, altering the reflection. Sometimes, handheld technologies use a panel that carries an electrical charge. When a finger touches the screen, the touch disrupts the panel's electrical field. The disruption is registered and sent to the software, which then initiates a response to the gesture.

Figure 4:
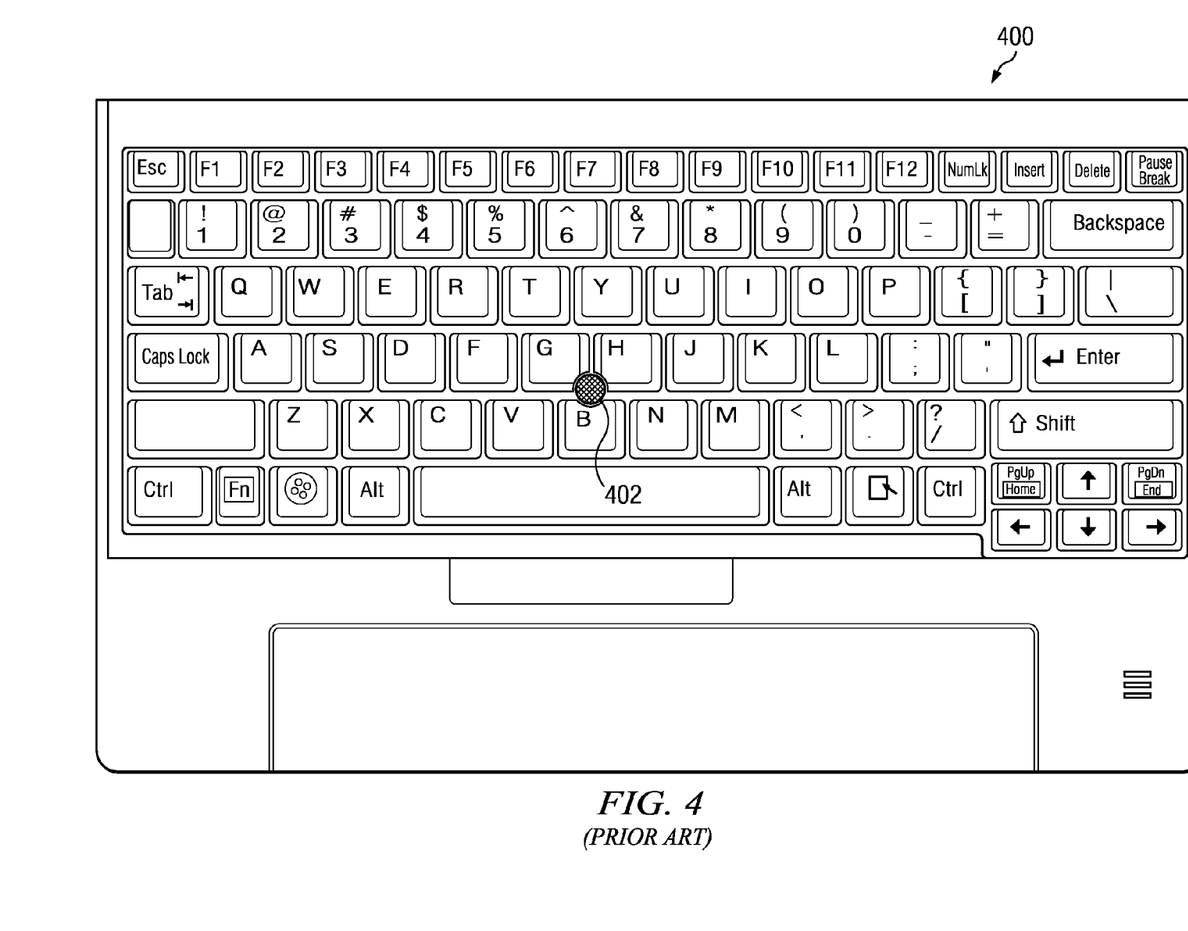
FIG. 4 illustrates an example keyboard that has one quick-point controller.

Sometimes, a keyboard, such as a keyboard for a notebook computer, may include a quick-point controller, in addition to or in place of a touch pad. FIG. 4 illustrates an example keyboard 400 that includes one quick-point controller 402 placed between keys G, H, B. Typically, a user may control quick-point controller 402 with the index finger of his right or left hand, depending on whether the user is right-handed or left-handed. The user may place his index finger on quick-point controller 402 to rotate quick-point controller 402 in various directions or to press quick-point controller 402 downward. The movement of quick-point controller 402 may correspond to the movement of a cursor displayed on a screen of the computer. Thus, the user may control the movement and functionality of the cursor via quick-point controller 402.\

In particular embodiments, a quick-point controller (sometimes called a pointing stick, a trackpoint, or a trackstick) may be an isometric joystick used as a pointing device. A quick-point controller may operate by sensing applied force using a pair of resistive strain gauges. A velocity of the cursor may depend on the applied force. A quick-point controller may have a replaceable rubber cap, which may be red. The cap may have a slightly rough "eraser head" material (e.g., classic dome) or other optional shapes (e.g., soft dome or soft rim). The sensitivity of a quick-point controller may be adjustable and may be set to provide a light touch. In particular embodiments, press-to-select may be an optional feature, where a sharp tap on the pointing stick may be equivalent to a button-click. The button thus clicked may be configured to be 1, 2, or 3. In particular embodiments, together with software wheel-emulation, a quick-point controller (and 3 buttons) can provide almost the entire behavior of a 3-button, 2-wheel mouse. Tapping button-2 will generate a middle-click; holding button-2 while simultaneously moving the pointer will generate vertical and horizontal scrolling events.

In particular embodiments, a quick-point controller may have one or more tactile features. As an example, a quick-point controller may have an actuator beneath it that can stimulate the user's finger. It may bumps up against the user's finger to give the user tactile feedback indicating the meaning of the cursor location. With such features, the user may be able to "feel" icons, title bars, menu items, and window borders. These responses may allow more accurate movement and selection by complementing the visual feedback with a sense of touch.

In particular embodiments, a quick-point controller may have a negative-inertia feature that causes a cursor's velocity to overreact when it is accelerated or decelerated. this feature may help to avoid a feeling of inertia or sluggishness when starting or stopping movement. In many control applications, a trade-off may exist between dynamic response and accuracy. This conflict arises for example in mouse manipulation with a graphical user interface (GUI). With a quick-point controller, a transfer function may be used to convert the user's pointing force into cursor motion. This transfer function may embody the semantics of pixel and character selection as well as human limits of eye-tracking and force control. In particular embodiments, this transfer function may be static; it may make no use of dynamic information in the forces applied to the quick-point controller. The dynamics of cursor movement may be important for fast and accurate manipulation. With static transfer functions, the movement may be somewhat sluggish. It takes a finite time for the user to apply and remove force from a quick-point controller, and the cursor motion may start and stop slowly, as if the cursor had inertia—it takes time to get it moving and to get it to stop again. A negative-inertia feature may help solve this problem by counteracting that inertia. This effect may accomplished by exaggerating changes in the input force. In particular embodiments, when the negative-inertia transfer function detects changes in the input force, it assumes that those changes are the beginning of a greater change and makes larger changes than those being commanded. The result is a cursor which takes off and stops quickly, even backing-up slightly to correct for overshoot. These exaggerations may be controlled by a nonlinear response that reduces "hunting" problems that can result from too-quick movements near a target.

If the user is right-handed, then when he places his right index finger on quick-point controller 402, the right middle finger naturally rests in the area between keys U, H, J and the right ring finger naturally rests in the area between keys 9, I, O or the area between keys I, O, K, L. If the user is left-handed, then when he places his left index finger on quick-point controller 402, the left middle finger naturally rests in the area between keys T, F, G and the left ring finger naturally rests in the area between keys 4, E, R or the area between keys W, E, S, D.

Figure 5:
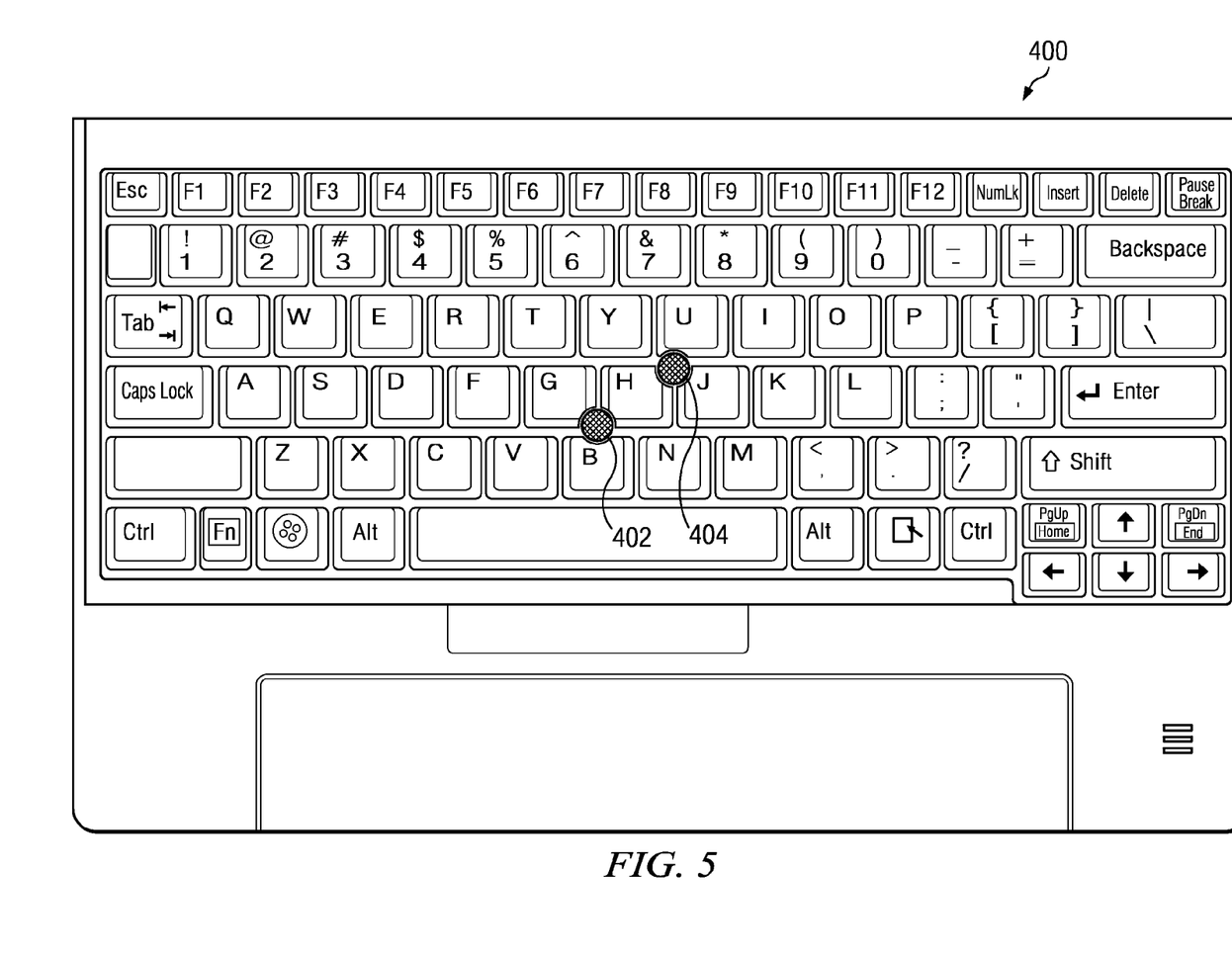
FIG. 5 illustrates an example keyboard that has two quick-point controllers.

In particular embodiments, a keyboard may include multiple quick-point controllers. In particular embodiments, the keyboard may be a QWERTY keyboard that may be used in connection with any computer or electronic devices. In particular embodiments, the multiple quick-point controllers may be placed on the keyboard such that their placements correspond to the positions of multiple fingers of a user's hand. As a result, a user may control multiple quick-point controllers using multiple fingers with relative ease. FIG. 5 illustrates example keyboard 400 including two quick-point controllers 402 and 404. In particular embodiments, quick-point controller 402 is placed between keys G, H, B, similar as illustrated in FIG. 4. In particular embodiments, quick-point controller 404 is placed between keys U, H, J. The placements of quick-point controllers 402 and 404 are more suitable for right-handed users, as a user may control quick-point controllers 402 and 404 with the index and middle fingers of his right hand. Of course, a user may also control quick-point controllers 402 and 404 with other fingers or with fingers from both hands.

Figure 6:
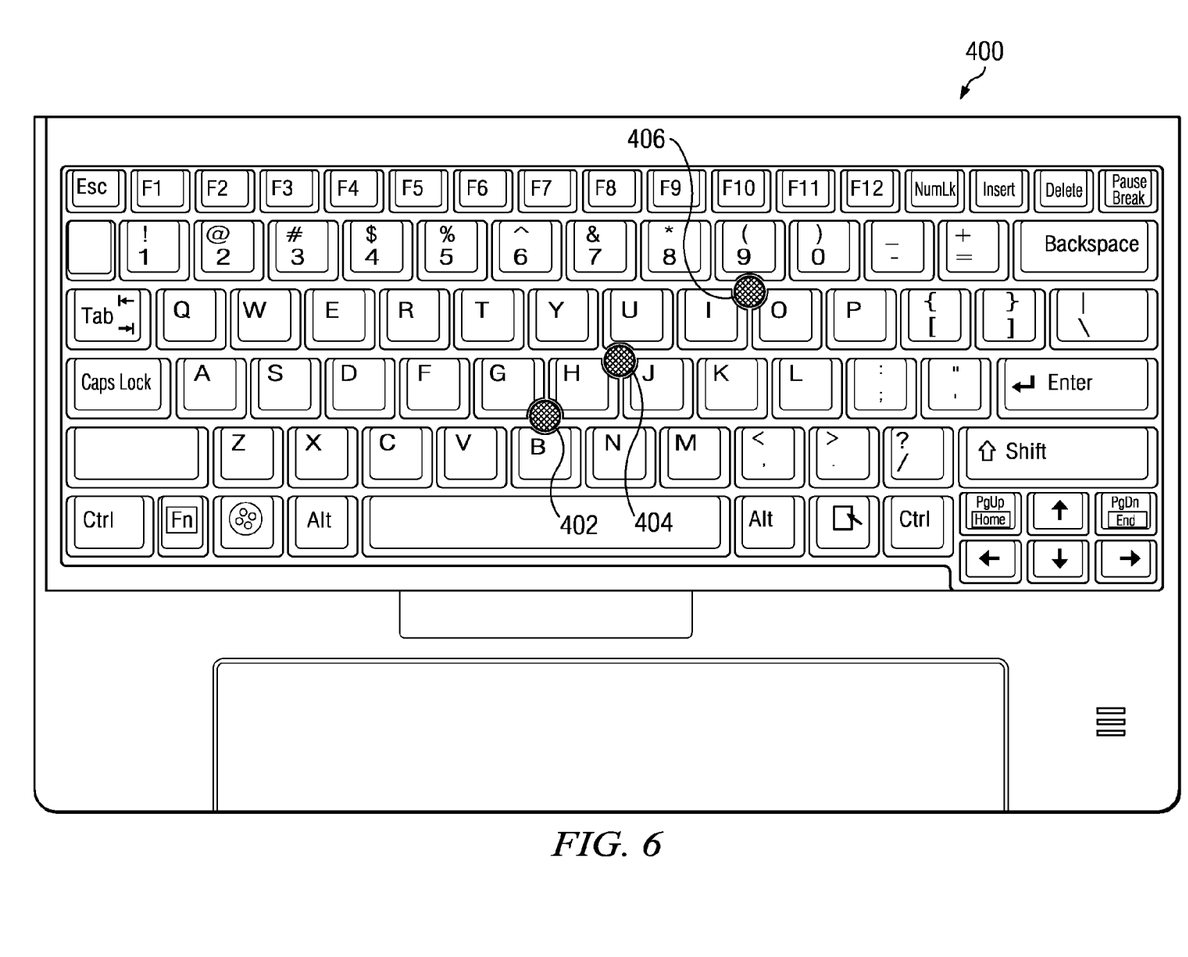
FIG. 6 illustrates an example keyboard that has three quick-point controllers.

FIG. 6 illustrates example keyboard 400 including three quick-point controllers 402, 404, and 406. In particular embodiments, quick-point controller 402 is placed between keys G, H, B, similar as illustrated in FIGS. 4 and 5. In particular embodiments, quick-point controller 404 is placed between keys U, H, J, similar as illustrated in FIG. 5. In particular embodiments, quick-point controller 406 is placed between keys 9, I, O. The placements of quick-point controllers 402, 404, and 406, again, are more suitable for right-handed users, as a user may control quick-point controllers 402, 404, and 406 with the index, middle, and ring fingers of his right hand. Of course, a user may also control quick-point controllers 402, 404, and 406 with other fingers or with fingers from both hands.

Figure 7:
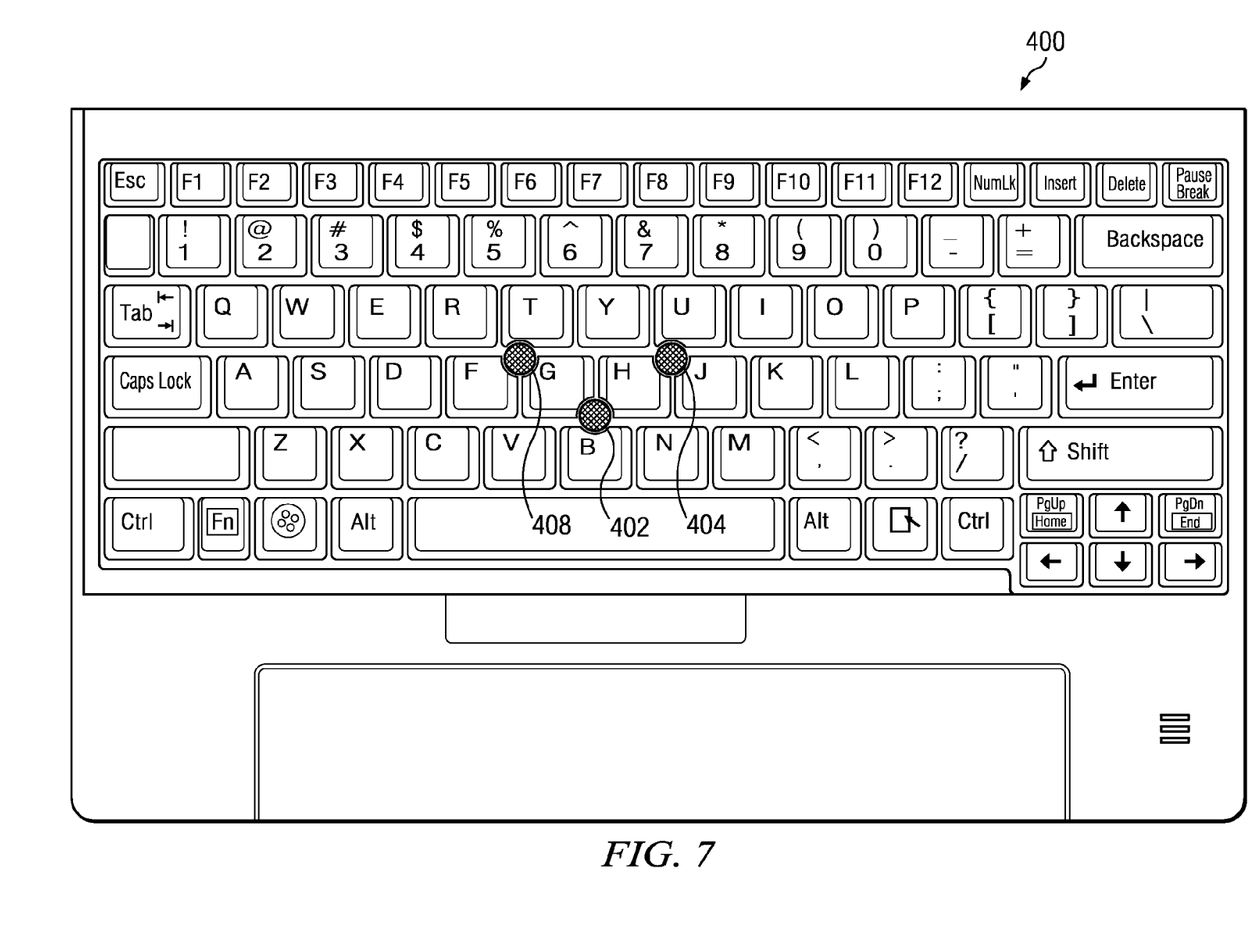
FIG. 7 illustrates an example keyboard that has three quick-point controllers.

In particular embodiment, quick-point controllers may also be placed on a keyboard to accommodate left-handed users. FIG. 7 illustrates example keyboard 400, again including three quick-point controllers 402, 404, and 408. In particular embodiments, quick-point controller 402 is placed between keys G, H, B; and quick-point controller 404 is placed between keys U, H, J. In particular embodiments, quick-point controller 408 is placed between keys T, F, G, which is more suitable for left-handed users. For example, a user may control quick-point controllers 402 and 408 with the index and middle fingers of his left hand. In addition, the user may also control quick-point controllers 402 and 406 with the index and middle fingers of his right hand.

Figure 8:
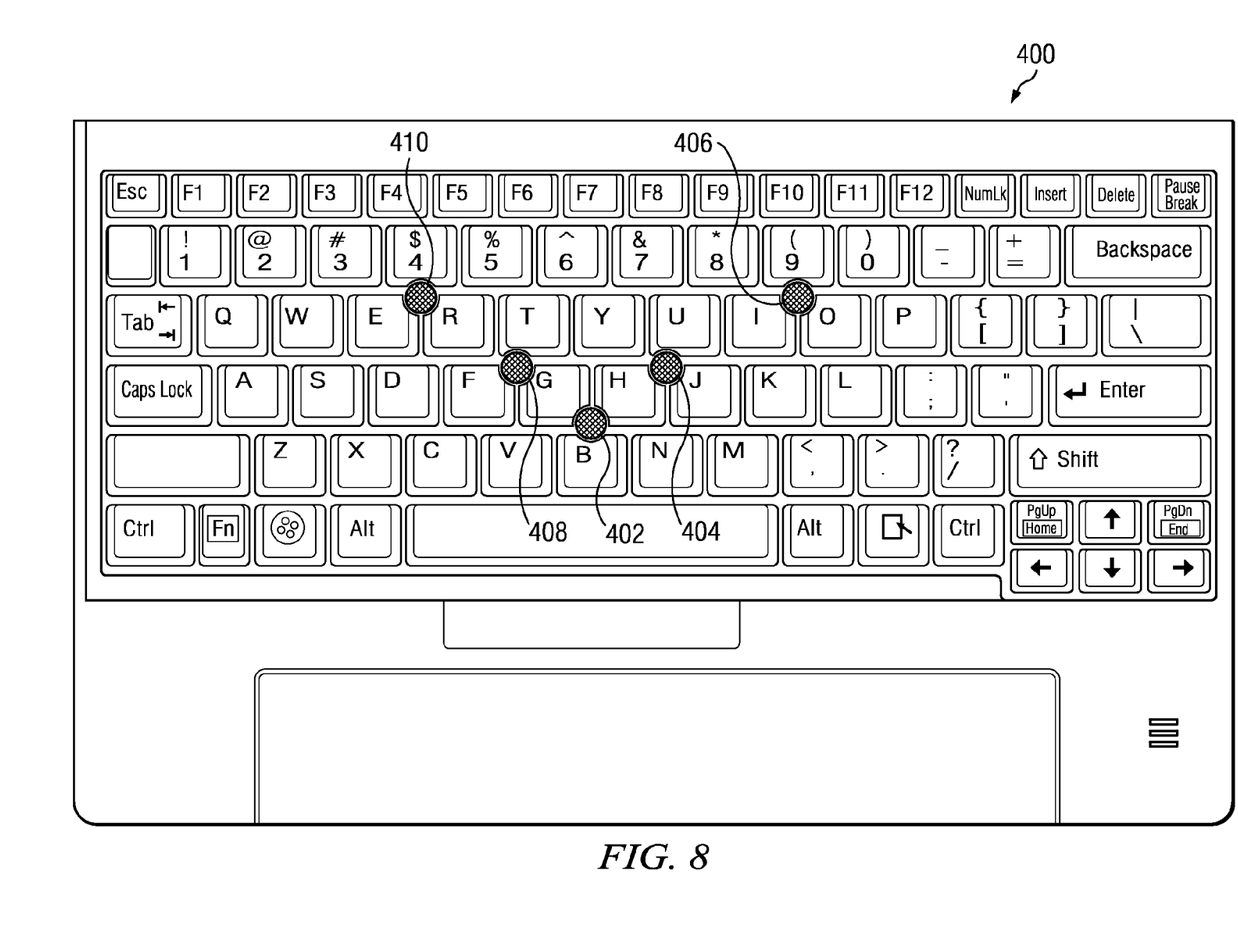
FIG. 8 illustrates an example keyboard that has five quick-point controllers.

Any number of quick-point controllers may be included on a keyboard. FIG. 8 illustrates example keyboard 400 including five quick-point controllers 402, 404, 406, 408, and 410. In particular embodiments, quick-point controller 402 is placed between keys G, H, B; quick-point controller 404 is placed between keys U, H, J; and quick-point controller 406 is placed between keys 9, I, O. In particular embodiments, quick-point controller 408 is placed between keys T, F, G; and quick-point controller 410 is placed between keys 4, E, R. A user may control quick-point controllers 402, 404, 406, 408, and 410 with fingers from both hands. For example, quick-point controllers 402, 404, and 406 may be controlled with the index, middle, and ring fingers of the user's right hand, and quick-point controllers 402, 408, and 410 may be controlled with the index, middle, and ring fingers of the user's left hand.

In particular embodiments, multiple quick-points included on a keyboard, such as the configurations illustrated in FIGS.

5-8, enable users to provide different combinations of gestures that may be used as control or command input to a computer or other electronic device. For example, the multi-touch interfaces, implemented using multiple quick-point controllers, may provide, among others, the ability to perform scrolling, zooming, and rotating of a user-interface (UI) component. Using quick-point controllers to implement multi-touch interfaces has several advantages compared to a touch-pad interface or a mouse. For example, quick-point controllers require less space and minimize hand movement since navigation with a quick-point controller does not require a user to lift his hands from the keyboard to control either a mouse or a touchpad.

In particular embodiments, each quick-point controller may be pressure-sensitive. In particular embodiments, the pressure on the quick-point controllers may be used to distinguish different input. For example, the pressure may be used to control the speed of scrolling, either when the scrolling gesture is used or combined with a traditional mouse. In the former case, the speed of scrolling may vary depending on how hard a user press down on a quick-point controller. In the latter case, a quick-point controller can be used either to control the speed of scrolling of a mouse wheel or the slow-down of a scroll operation initiated with a mouse wheel, analogously to a break. Additionally, tapping on a quick-point controller can act as a function key. For example, it can select a block of text or copy an already highlighted block of text.

Figure 9:
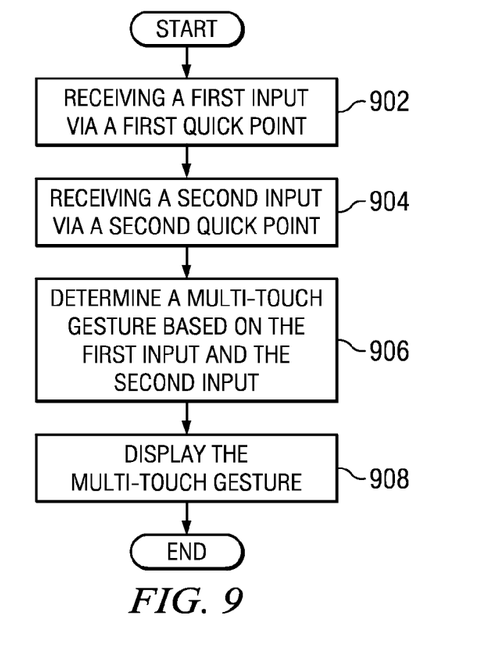
FIG. 9 illustrates an example method for providing a multi-touch input using multiple quick-point controllers.

In particular embodiments, multiple quick-point controllers, such as multiple quick-point controllers placed on a keyboard, may be used to implement a multi-touch interface. In particular embodiments, each quick-point controller may be used to provided a part of a hand-finger gesture. Two or more quick-point controllers together may provided a complete hand-finger gesture that may be interpreted, for example, by computer software, as to correspond to a particular input. FIG. 9 illustrates an example method for providing a multi-touch input using two or more quick-point controllers. The method may start at step 902, where a first input is received via a first quick-point controller. A user may provide the first input by, for example, placing a finger on the first quick-point controller and rotating or pressing on the first quick-point controller. At step 904, a second input is received via a second quick-point controller. Again, the user may provide the second input by, for example, placing a finger on the second quick-point controller and rotating or pressing on the second quick-point controller. Optionally, additional input may be received via additional quick-point controllers. In particular embodiments, the first input and the second input may be received simultaneously. For example, the user may place two fingers on the first and second quick-point controllers respectively and rotate or press on the two quick-point controllers simultaneously. In particular embodiments, the first input and the second input may be received sequentially. For example, the user may use a finger to rotate or press on the first quick-point controller, and then rotate or press on the second quick-point controller. At step 906, a multi-touch gesture may be determined based on the first input and the second input. If there are addition input provided via additional quick-point controllers, then the multi-touch gesture may be determined based on all the input received. In particular embodiments, different combinations of the input provided via the quick-point controllers correspond to different multi-touch gestures. In particular embodiments, computer software stored in computer-readable media may implement the functionalities that determine the multi-touch gestures based on combinations of input provided via the quick-point controllers. At step 908, the multi-touch gesture is displayed, for example on a screen of the computer to which the keyboard is connected, at which point the method may end. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates particular components carrying out particular steps of the method of FIG. 9, this disclosure contemplates any suitable combination of any suitable components carrying out any suitable steps of the method of FIG. 9.

Figure 10:
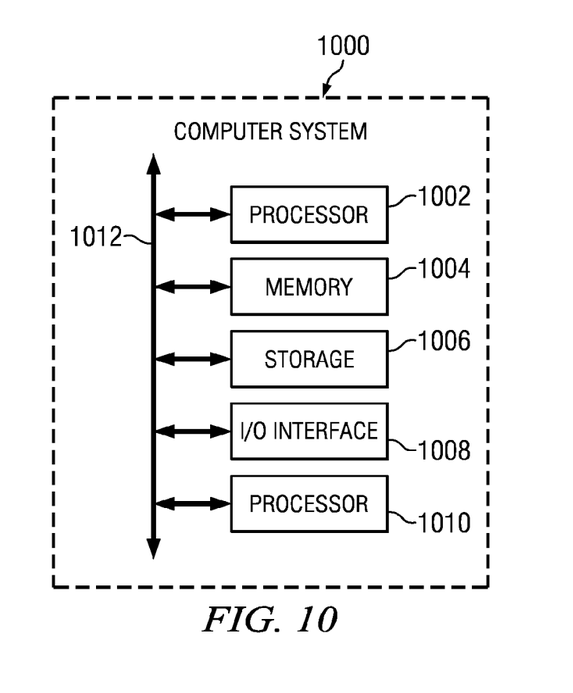
FIG. 10 illustrates an example computer system.

In particular embodiments, a keyboard that includes multiple quick-point controllers for implementing multi-touch interfaces may be use with a computer system. FIG. 10 illustrates an example computer system 1000 suitable to be used with such a keyboard. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (e.g., another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (e.g., packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 1002 (e.g., one or more internal registers or caches), one or more portions of memory 1004, one or more portions of storage 1006, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
receiving first input from a first quick-point controller in a keypad that comprises a plurality of keys, wherein the first quick-point controller is located along a first row of keys of the keypad and along a first column of keys of the keypad;
receiving second input from at least a second quick-point controller in the keypad, wherein the second quick-point controller is located along a second row of keys of the keypad that is different from the first row and along a second column of keys of the keypad that is different from the first column;
receiving third input from at least a third quick-point controller in the keypad, wherein the third quick-point controller is located along a third row of keys of the keypad that is different from the first row or the second row and along a third column of keys of the keypad that is different from the first or the second column; and
rendering a multi-touch gesture on a display associated with the keypad based on the first, second, and third inputs.

2. The method of claim 1, wherein:
the keypad is a QWERTY keyboard;
the first quick-point controller is located in-between a G key, an H key, and a B key of the QWERTY keyboard; and
the second quick-point controller is located in-between a U key, the H key, and a J key of the QWERTY keyboard.

3. The method of claim 1, wherein:
the keypad is a QWERTY keyboard;
the first quick-point controller is located in-between a G key, an H key, and a B key of the QWERTY keyboard; and
the second quick-point controller is located in-between a T key, an F key, and a G key of the QWERTY keyboard.

4. The method of claim 1, wherein: the keypad is a QWERTY keyboard;
the first quick-point controller is located in-between a G key, an H key, and a B key of the QWERTY keyboard;

the second quick-point controller is located in-between a U key, the H key, and a J key of the QWERTY keyboard; and the third quick-point controller is located in-between a 9 key, an I key, and an O key of the QWERTY keyboard.

5. The method of claim 1, wherein:
the keypad is a QWERTY keyboard;
the first quick-point controller is located in-between a G key, an H key, and a B key of the QWERTY keyboard;
the second quick-point controller is located in-between a T key, an F key, and a G key of the QWERTY keyboard; and
the third quick-point controller is located in-between a 4 key, an E key, and an R key of the QWERTY keyboard.

6. The method of claim 1, wherein the multi-touch gesture comprises scrolling, zooming, or rotating a user interface (UI) component on the display.

7. The method of claim 1, wherein the keypad is a keyboard of a laptop computer and the display is presented through a screen of the laptop computer.

8. A computer-readable non-transitory storage medium that comprises software that is operable when executed to:
receive first input from a first quick-point controller in a keypad that comprises a plurality of keys, wherein the first quick-point controller is located along a first row of keys of the keypad and along a first column of keys of the keypad;
receive second input from at least a second quick-point controller in the keypad, wherein the second quick-point controller is located along a second row of keys of the keypad that is different from the first row and along a second column of keys of the keypad that is different from the first column;
receive third input from at least a third quick-point controller in the keypad, wherein the third quick-point controller is located along a third row of keys of the keypad that is different from the first row or the second row and along a third column of keys of the keypad that is different from the first or the second column; and
render a multi-touch gesture on a display associated with the keypad based on the first, second, and third inputs.

9. The medium of claim 8, wherein:
the keypad is keyboard;
the first quick-point controller is located in-between a G key, an H key, and a B key of the QWERTY keyboard; and
the second quick-point controller is located in-between a U key, the H key, and a J key of the QWERTY keyboard.

10. The medium of claim 8, wherein:
the keypad is a QWERTY keyboard;
the first quick-point controller is located in-between a G key, an H key, and a B key of the QWERTY keyboard; and
the second quick-point controller is located in-between a T key, an F key, and a G key of the QWERTY keyboard.

11. The medium of claim 8, wherein:
the keypad is a QWERTY keyboard;
the first quick-point controller is located in-between a G key, an H key, and a B key of the QWERTY keyboard;
the second quick-point controller is located in-between a U key, the H key, and a J key of the QWERTY keyboard; and
the third quick-point controller is located in-between a 9 key, an I key, and an O key of the QWERTY keyboard.

12. The medium of claim 8, wherein:
the keypad is a QWERTY keyboard;
the first quick-point controller is located in-between a G key, an H key, and a B key of the QWERTY keyboard;
the second quick-point controller is located in-between a T key, an F key, and a G key of the QWERTY keyboard; and
the third quick-point controller is located in-between a 4 key, an E key, and an R key of the QWERTY keyboard.

13. The medium of claim 8, wherein the multi-touch gesture comprises scrolling, zooming, or rotating a user interface (UI) component on the display.

14. The medium of claim 8, wherein the keypad is a keyboard of a laptop computer and the display is presented through a screen of the laptop computer.

15. A keypad comprising
a plurality of keys;
a first quick-point controller located among the keys, wherein the first quick-point controller is located along a first row of keys of the keypad and along a first column of keys of the keypad;
at least a second quick-point controller located among the keys, wherein the second quick-point controller is located along a second row of keys of the keypad that is different from the first row and along a second column of keys of the keypad that is different from the first column; and
at least a third quick-point controller among the keys, wherein the third quick-point controller is located along a third row of keys of the keypad that is different from the first row or the second row and along a third column of keys of the keypad that is different from the first or the second column.

16. The keypad of claim 15, wherein:
the keypad is a QWERTY keyboard;
the first quick-point controller is located in-between a G key, an H key, and a B key of the QWERTY keyboard; and
the second quick-point controller is located in-between a U key, the H key, and a J key of the QWERTY keyboard.

17. The keypad of claim 15, wherein:
the keypad is a QWERTY keyboard;
the first quick-point controller is located in-between a G key, an H key, and a B key of the QWERTY keyboard; and
the second quick-point controller is located in-between a T key, an F key, and a G key of the QWERTY keyboard.

18. The Keypad of claim 15, wherein:
the keypad is a QWERTY keyboard;
the first quick-point controller is located in-between a G key, an H key, and a B key of the QWERTY keyboard;
the second quick-point controller is located in-between a U key, the H key, and a J key of the QWERTY keyboard; and
the third quick-point controller is located in-between a 9 key, an I key, and an O key of the QWERTY keyboard.

19. The Keypad of claim 15, wherein:
the keypad is a QWERTY keyboard;
the first quick-point controller is located in-between a G key, an H key, and a B key of the QWERTY keyboard;
the second quick-point controller is located in-between a T key, an F key, and a G key of the QWERTY keyboard; and
the third quick-point controller is located in-between a 4 key, an E key, and an R key of the QWERTY keyboard.

20. The keypad of claim 15, wherein the keypad is a keyboard of a laptop computer and the display is presented through a screen of the laptop computer.

* * * * *

UNITED STATES PATENT AND TRADEMARK OFFICE
CERTIFICATE OF CORRECTION

| | | |
|---|---|---|
| PATENT NO. | : 8,878,787 B2 | Page 1 of 1 |
| APPLICATION NO. | : 12/855954 | |
| DATED | : November 4, 2014 | |
| INVENTOR(S) | : Stergios Stergiou et al. | |

It is certified that error appears in the above-identified patent and that said Letters Patent is hereby corrected as shown below:

In the claims:

Col. 11, Ln. 43: After "the keypad is" and before "keyboard;" insert --a QWERTY--.

Signed and Sealed this
Tenth Day of February, 2015

Michelle K. Lee
*Deputy Director of the United States Patent and Trademark Office*